(12) United States Patent
Yamamoto et al.

(10) Patent No.: US 6,336,945 B1
(45) Date of Patent: *Jan. 8, 2002

(54) ABRASIVE COMPOSITION FOR THE BASE OF MAGNETIC RECORDING MEDIUM AND PROCESS FOR PRODUCING THE BASE BY USING THE SAME

(75) Inventors: Yuzo Yamamoto, Osaka; Manabu Shibata, Tochigi; Koji Taira; Toshiya Hagihara, both of Wakayama, all of (JP)

(73) Assignee: Kao Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,994
(22) PCT Filed: Nov. 7, 1997
(86) PCT No.: PCT/JP97/04070
§ 371 Date: May 13, 1999
§ 102(e) Date: May 13, 1999
(87) PCT Pub. No.: WO98/21289
PCT Pub. Date: May 22, 1998

(30) Foreign Application Priority Data

Nov. 14, 1996 (JP) .............................................. 8-303115
Nov. 14, 1996 (JP) .............................................. 8-303116
Nov. 14, 1996 (JP) .............................................. 8-303117

(51) Int. Cl.$^7$ ............................ C09K 3/14; C09G 1/02; B24B 1/00
(52) U.S. Cl. ............................... 51/309; 51/307; 106/3; 451/36; 451/37
(58) Field of Search .......................... 51/307, 309, 308; 438/692, 693; 106/3; 510/165, 167, 397; 451/37, 36

(56) References Cited

U.S. PATENT DOCUMENTS

| | | | | |
|---|---|---|---|---|
| 3,850,834 A | * | 11/1974 | Hellsten et al. .............. | 252/117 |
| 3,985,668 A | * | 10/1976 | Hartman ...................... | 252/99 |
| 4,051,056 A | * | 9/1977 | Hartman ...................... | 252/99 |
| 4,469,839 A | * | 9/1984 | Maruhashi et al. ......... | 524/458 |
| 4,956,015 A | * | 9/1990 | Okajima et al. .............. | 51/308 |
| 5,167,872 A | * | 12/1992 | Pancheri et al. ............. | 252/544 |
| 5,264,010 A | * | 11/1993 | Brancaleoni et al. ......... | 51/309 |
| 5,266,088 A | * | 11/1993 | Sandusky et al. ............. | 51/309 |
| 5,366,542 A | * | 11/1994 | Yamada et al. ................ | 51/309 |
| 5,413,890 A | * | 5/1995 | Mori et al. .................. | 430/110 |
| 5,439,773 A | * | 8/1995 | Matsui et al. ................ | 430/110 |
| 5,464,724 A | * | 11/1995 | Akiyama et al. ........... | 430/272 |
| 5,527,423 A | * | 6/1996 | Neville et al. ................ | 51/308 |
| 5,750,230 A | * | 5/1998 | Ishikawa et al. ........... | 428/65.3 |
| 5,888,950 A | * | 3/1999 | Potini et al. ................ | 510/113 |
| 5,912,079 A | * | 6/1999 | Miyagawa et al. ......... | 428/375 |
| 5,954,997 A | * | 9/1999 | Kaufman et al. .......... | 252/79.1 |

FOREIGN PATENT DOCUMENTS

| | | |
|---|---|---|
| JP | 51-16308 | 2/1976 |
| JP | 51-76685 | 7/1976 |
| JP | 54-89389 | 7/1979 |
| JP | 62-43482 | 2/1987 |
| JP | 1-97560 | 4/1989 |
| JP | 1-205973 | 8/1989 |
| JP | 2-73898 | 3/1990 |
| JP | 4-291723 | 10/1992 |
| JP | 5-230440 | 9/1993 |
| JP | 9-143455 | 6/1997 |

* cited by examiner

Primary Examiner—Michael Marcheschi
(74) Attorney, Agent, or Firm—Oblon, Spivak, McClelland, Maier & Neustadt, P.C.

(57) ABSTRACT

The present invention relates to an abrasive composition for substrates of magnetic recording media, containing at least an abrasive, an abrasive auxiliary and water. The abrasive auxiliary comprises an aliphatic organic sulfate, an oxyalkylene alkyl ether sulfate or an amphoteric surface active agent, and the abrasive composition has a pH of 1 to 13.

8 Claims, 1 Drawing Sheet

ABRASIVE COMPOSITION FOR THE BASE OF MAGNETIC RECORDING MEDIUM AND PROCESS FOR PRODUCING THE BASE BY USING THE SAME

TECHNICAL FIELD

The present invention relates to an abrasive composition for substrates of magnetic recording media which provides an abraded surface with a low surface roughness at an improved rate of abrasion. The present invention also relates to a process for producing substrates of magnetic recording media using the abrasive composition, particularly a process for producing substrates of magnetic recording media using Ni—P plated aluminum alloy substrates and carbon substrates.

BACKGROUND ART

Abrasive compositions comprising abrasive particles and an aliphatic organic sulfate, an oxyalkylene alkyl ether sulfate or an ampholytic surface active agent are disclosed, e.g., in Japanese Patent Laid-Open Nos. 51-16308 (corresponding to U.S. Pat. No. 3,985,668), 51-76685 (corresponding to U.S. Pat. No. 4,051,056), 62-43482, 2-73898, 4-291723, 5-230440 and 8-41443.

Of the known abrasive compositions the one described in Japanese Patent Laid-Open Nos. 51-16308 and 51-76685 are detergents for a hard surface for domestic use simply called cleansers.

Japanese Patent Laid-Open No. 2-73898 also discloses a cleanser, aiming at preventing abrasive particles from precipitating with lapse of time during long-term storage (improving suspension stability) and improving flowability. The abrasive particles used in the composition are not sufficiently hard. Therefore, rate of abrading substrates of magnetic recording media cannot be improved, and a low surface roughness of the substrates cannot be achieved with this composition.

The abrasive composition described in Japanese Patent Laid-Open No. 62-43482 was developed with the intention of preventing abrasive particles from pricipitating with lapse of time and improving wetting properties and spreadability to the materials to be abraded. Rate of abrading substrates of magnetic recording media cannot be improved, and a low surface roughness of substrates cannot be achieved with this composition.

The abrasive composition described in Japanese Patent Laid-Open No. 4-291723 relates to the abrasion for silicon wafer, aiming at preventing clouds on surfaces of a silicon wafer. There is nothing to disclose to improve the rate of abrading substrates of magnetic recording media and to achieve a low surface roughness of substrates.

The abrasive composition described in Japanese Patent Laid-Open No. 5-230440 relates to the abrasion using diamond, aiming at preventing substrate surfaces from the damage caused by the contact of the work and abrasive particles left between the work and platen. There is nothing to disclose to improve the rate of abrading substrates of magnetic recording media, and to achieve a low surface roughness of substrates.

The abrasive composition described in Japanese Laid-Open No. 8-41443 is used in combination with an abrading buff, aiming at enhancing the surface luster of stainless steel or non-iron metal to give appliances or interior decoration a good appearance. There is nothing to disclose to improve the rate of abrading substrates of magnetic recording media and to achieve a low surface roughness of substrates.

Abrasive compositions comprising abrasive particles, such as diamond, alumina or SiC, of submicrons or several tens of microns in size dispersed in water, which are used for surface abrasion of brittle materials such as glass materials, carbon substrates and ceramic materials, and ductile materials such as Ni—P plated aluminum are also known (see Japanese Patent Laid-Open Nos. 54-89389, 1-205973, 1-97560 and 9-143455) as other related art.

However, these conventional abrasive compositions were unsatisfactory in dispersibility of abrasive particles, dispersibility and removability of the waste chips or powders resulting from abrasion, and prevention of re-adhesion of the waste chips or powders, which tends to cause surface defects, such as pits or scratches. Further, the rate of abrasion cannot be raised, imposing a limit on cost reduction.

DISCLOSURE OF THE INVENTION

Accordingly, an object of the present invention is to provide an abrasive composition for substrates of magnetic recording media which can provide an abraded surface with a low roughness at an improved rate of abrasion without causing surface defects such as pits and scratches.

Another object of the present invention is to provide an abrasive composition for substrates of magnetic recording media suitable for abrading brittle materials such as glass, carbon and ceramics.

A further object of the present invention is to provide an abrasive composition for substrates of magnetic recording media suitable for abrading ductile materials such as Al, Si, W and Cu metals, particularly abrading Ni—P plated aluminum alloy substrates.

A still further object of the present invention is to provide an abrasive composition suitable for abrading substrates of magnetic recording media, particularly abrading substrates for hard disks.

A still further object of the present invention is to provide a process for producing substrates of magnetic recording media free from pits or scratches.

As a result of extensive investigations, the inventors of the present invention have found that the above objects can be accomplished by an abrasive composition for substrates of magnetic recording media which contains a specific abrasive auxiliary and is adjusted to have a pH within a specific range, and a process for producing substrates of magnetic recording media using the abrasive composition.

The present invention has been completed based on this finding. That is, the above objects have been achieved by an abrasive composition for substrates of magnetic recording media, containing at least an abrasive, an abrasive auxiliary and water, wherein the abrasive auxiliary comprises at least one aliphatic organic sulfate, and the composition has a pH of 1 to 13.

Further, the above objects have been achieved by an abrasive composition for substrates of magnetic recording media, containing at least an abrasive, an abrasive auxiliary and water, wherein the abrasive auxiliary comprises at least one oxyalkylene alkyl ether sulfate represented by formula (2), and the composition has a pH of 1 to 13.

$$R\text{—}O\text{—}(AO)_n\text{—}SO_3M \qquad (2)$$

wherein R represents a straight-chain or branched alkyl group, an aryl group or an alkylaryl group each having 5 to 21 carbon atoms; AO represents an oxyalkylene group having 2 or 3 carbon atoms; n represents a natural number of 1 to 30; and M represents an alkali metal, an alkaline earth metal or an organic cation.

Furthermore, the above objects have been achieved by an abrasive composition for substrates of magnetic recording media, containing at least an abrasive, an abrasive auxiliary and water, wherein the abrasive auxiliary comprises at least one amphoteric surface active agent, and the composition has a pH of 1 to 13.

The present invention also provides a process for producing substrates of magnetic recording media, comprising the step of abrading a substrate precursor with an abrasive composition containing at least an abrasive, an abrasive auxiliary and water, wherein the above-described abrasive compositions for substrates of magnetic recording media are used.

PREFERRED EMBODIMENTS FOR CARRYING OUT THE INVENTION

The abrasive composition for substrates of magnetic recording media (hereinafter, referred to simply as "abrasive composition") of the present invention will be described in detail below.

First, the abrasive composition containing an aliphatic organic sulfate as the abrasive auxiliary will be described.

The aliphatic organic sulfate includes water-soluble ones commonly known as anionic surface active agents. The aliphatic organic sulfate can be used either individually or as a combination of two or more thereof. Use of the aliphatic organic sulfate combined with pH adjustment of the abrasive composition within a range of from 1 to 13 brings improvement in rate of abrasion and reduction of surface roughness.

The term "aliphatic organic sulfate" as used herein is intended to embrace both aliphatic organic sulfates and aromatic organic sulfates.

The aliphatic organic sulfate is incorporated into the abrasive composition preferably in an amount of 0.01 to 20% by weight. If the amount of the aliphatic organic sulfate is less than 0.01% by weight, the abrasive composition may fail to sufficiently exhibit improved abrasion rate and a low surface roughness. If it exceeds 20% by weight, the abrasive composition becomes viscose, resulting in the deterioration in abrading efficiency or the increase of the load of waste water disposal. A still preferred amount of the aliphatic organic sulfate to be used is 0.05 to 10% by weight. A particularly preferred amount is 0.1 to 5% by weight.

Of the aliphatic organic sulfates particularly preferred in the present invention are those represented by formula (1):

$$R—O—SO_3M \quad (1)$$

wherein R represents a straight-chain or branched-chain alkyl group, an aryl group or an alkylaryl group each having 5 to 21 carbon atoms; and M represents an alkali metal, an alkaline earth metal or an organic cation.

In formula (1), if the number of the carbon atoms in R is less than 5, the performance in clearing off the waste chips or powders resulting from abrasion or preventing re-adhesion of the waste chips or powders may be insufficient. If it exceeds 21, the aliphatic organic sulfate may have poor solubility or disperse stability in the abrasive composition or may reduce these properties during use of the abrasive composition. The number of the carbon atoms in R is preferably 8 to 14, still preferably 10 to 14.

Examples of the alkyl group represented by R are pentyl, hexyl, heptyl, octyl, nonyl, decyl, undecyl, dodecyl, tridecyl, tetradecyl, pentadecyl, hexadecyl, octadecyl, nonadecyl, eicosyl, t-butyl, isooctyl and isododecyl groups. Examples of the aryl group as R are phenyl, biphenyl, naphthyl and anthryl groups. Examples of the arylalkyl group as R are tolyl, xylyl and octylphenyl groups.

From the viewpoint of oxidative stability and stability against decomposition by mechanical wear, R is preferably an alkyl group.

In formula (1), M includes an alkali metal such as sodium and potassium, an alkaline earth metal such as calcium and magnesium, a quaternary ammonium ion, and an organic amine such as triethanolamine.

Specific but non-limiting examples of the aliphatic organic sulfate represented by formula (1) include heptyl sulfate, octyl sulfate, lauryl sulfate, higher alcohol (coconut oil) sulfates, myristyl sulfate, palmityl sulfate and stearyl sulfate, with octyl sulfate, lauryl sulfate, myristyl sulfate and stearyl sulfate being particularly preferred.

The aliphatic organic sulfate represented by formula (I) can be a commercially available one such as Emal 40, Emal TD, Emal TD-L, Emal AD-25, Emal AD-25R, Emal 0, Emal 10 Powder, Emal 10 Needle, Emal 2F Paste, Emal 2F Needle, Emal 40 Powder, Emal 40 Paste, Emal 71, and Latemul PS (all produced by Kao Corp.).

The aliphatic organic sulfates represented by formula (1) can be used individually or as a combination of two or more thereof in the abrasive composition of the present invention.

Then, the abrasive composition containing an oxyalkylene alkyl ether sulfate represented by the formula (2) as the abrasive auxiliary will be described.

The oxyalkylene alkyl ether sulfate includes water-soluble ones commonly known as anionic surface active agents. The oxyalkylene alkyl ether sulfate can be used either individually or as a combination of two or more thereof. Use of the oxyalkylene alkyl ether sulfate combined with pH adjustment of the abrasive composition within a range of from 1 to 13 brings improvement in rate of abrasion and reduction of surface roughness.

The term "oxyalkylene alkyl ether sulfate" as used herein is intended to embrace an oxyalkylene alkyl ether sulfate, an oxyalkylene aryl ether sulfate, and an oxyalkylene alkylaryl ether sulfate.

The oxyalkylene alkyl ether sulfate is incorporated into the abrasive composition preferably in an amount of 0.01 to 20% by weight, more preferably 0.02 to 10% by weight, still more preferably 0.05 to 5% by weight, for the same reasons as specified in using the aliphatic organic sulfate as the abrasive auxiliary.

In the oxyalkylene alkyl ether sulfate represented by formula (2), R is a straight-chain or branched-chain alkyl group, an aryl group or an alkylaryl group each having 5 to 21 carbon atoms. If the number of the carbon atoms in R is less than 5, the performance in clearing off the waste chips or powders resulting from abrasion or preventing re-adhesion of the waste chips or powders may be insufficient. If it exceeds 21, the oxyalkylene alkyl ether sulfate may have poor solubility or disperse stability in the abrasive composition or may reduce these properties during use of the abrasive composition.

R in formula (2) includes the same examples as those included in R in formula (1).

As in the case of formula (1), R in formula (2) preferably has 8 to 14 carbon atoms, particularly 10 to 14 carbon atoms. From the viewpoint of oxidative stability and stability against decomposition by mechanical wear, R is preferably an alkyl group.

In formula (2), AO is an oxyalkylene group having 2 to 3 carbon atoms. If the number of the carbon atoms in AO is out of the above range, the oxyalkylene alkyl ether sulfate may not sufficiently disperse the waste chips or powders resulting from the abrasion, and the rate of abrasion and surface roughness may not reach a sufficient level.

In formula (2), n is a natural number of 1 to 30. With n falling within this range, an adequate amount of fine bubbles are formed during abrasive processing, and the bubbles thus formed can easily remove the waste chips or powders out of the system, just like floatative removal in smelting. n is preferably 2 to 4.

M in formula (2) includes the same examples as those included in M in formula (1).

Specific but non-limiting examples of the oxyalkylene alkyl ether sulfate represented by formula (2) include oxyethylene lauryl ether sulfate having 2 or 3 oxyethylene groups per molecule, oxyethylene nonyl ether sulfate having 3 oxyethylene groups per molecule, oxyethylene octylphenyl ether sulfate having 3 oxyethylene groups per molecule, and oxyethylene nonylphenyl ether sulfate having 3 oxyethylene groups per molecule. In particular, oxyethylene lauryl ether sulfate having 3 oxyethylene groups per molecule, oxyethylene octylphenyl ether sulfate having 3 oxyethylene groups per molecule, and oxyethylene nonylphenyl ether sulfate having 3 oxyethylene groups per molecule are preferred.

The oxyalkylene alkyl ether sulfate represented by formula (2) can be a commercially available product, such as Emal 20C, Emal 20CM, Emal 20T, Emal NC-35, Emal E-27C, Emal E-70C, Levenol WZ, Levenol WX, and Latemul WX (all produced by Kao Corp.).

The oxyalkylene alkyl ether sulfates represented by formula (2) can be used individually or as a combination of two or more thereof in the abrasive composition.

The number of the oxyalkylene groups added per molecule of the oxyalkylene alkyl ether sulfate is subject to variation in accordance with the kind of the abrasive and the surface condition of a material to be abraded. Thus, the foaming properties of the abrasive composition, the dispersibility of the abrasive in the abrasive composition, and re-adhesion of waste chips or powders to the abraded surface of a material can be controlled, which facilitates designing of the abrasive auxiliary.

Then, the abrasive composition containing an amphotelic surface active agent as the abrasive auxiliary will be described.

The amphoteric surface active agent includes water-soluble ones of commonly known amphoteric surface active agents. The amphoteric surface active agents can be used either individually or as a combination of two or more thereof. Use of the amphoteric surface active agent combined with pH adjustment of the abrasive composition within a range of from 1 to 13 brings improvement in rate of abrasion and a surface of high quality with less scratches.

The amphoteric surface active agent is incorporated into the abrasive composition preferably in an amount of 0.01 to 20% by weight, more preferably 0.05 to 10% by weight, still more preferably 0.1 to 5% by weight, for the same reasons as specified in using the aliphatic organic sulfate as the abrasive auxiliary.

Of the amphoteric surface active agents particularly preferred in the present invention are those represented by formula (3):

wherein $R^1$, $R^2$, and $R^3$, which may be the same or different, each represent a straight-chain or branched-chain alkyl group, a group derived from the alkyl group (hereinafter referred to as an alkyl-derived group), an alkenyl group, a hydrogen atom or an $R^5$—Ar— group, wherein $R^5$ represents an alkyl group, an alkenyl group, a group derived from the alkyl group or a hydrogen atom, and Ar represents an aromatic group; $R^2$ and $R^3$ may be taken together to form a ring; $R^4$ represents a direct link or an alkylene group; and $Y^-$ represents an anionic group.

In formula (3) as mentioned above, $R^1$, $R^2$, and $R^3$, which may be the same or different, each represent the straight-chain or branched-chain alkyl group, the alkyl-derived group, the alkenyl group, a hydrogen atom or the $R^5$—Ar— group. The alkyl group, alkyl-derived group and alkenyl group preferably have 1 to 24 carbon atoms, more preferably 8 to 16 carbon atoms, from the view point of dispersibility and removability of the waste chips or powders resulting from abrasion, and prevention of re-adhesion of the waste chips or powders, and dissolution and dispersion stability of the surface active agent in the abrasive composition. Examples of the alkyl group are methyl, ethyl, butyl, heptyl, octyl, decyl, dodecyl, tridecyl, tetradecyl, pentadecyl, hexadecyl, octadecyl, nonadecyl, eicosyl, t-butyl, isooctyl, and isododecyl groups. Examples of the alkyl-derived group include the alkyl groups having functional groups such as hydroxyl, amino, mercapt, amido and phospho groups. Examples of the alkenyl group are propenyl, butenyl, butadienyl, pentenyl and octenyl groups.

In the $R^5$—Ar— group, the alkyl, alkenyl and alkyl-derived groups as represented by $R^5$ include the above-enumerated respective examples. Examples of the aromatic group as represented by Ar are phenylene, tolylene, biphenylene, naphthylene and anthrylene groups.

It is preferable that any one of $R^1$, $R^2$, and $R^3$ is a long-chain alkyl group having 5 to 24 carbon atoms, particularly 8 to 16 carbon atoms, and the two others are short-chain alkyl groups having 1 to 5 carbon atoms, particularly 1 to 3 carbon atoms.

The ring that may be formed of $R^2$ and $R^3$ can be made up of only the atoms contained in $R^2$ and $R^3$ or may contain other atoms. The ring thus formed includes an imidazoline ring.

Examples of the alkylene group represented by $R^4$ in formula (3) include those having 1 to 24 carbon atoms, preferably 8 to 16 carbon atoms, more preferably 1 to 3 carbon atoms, such as methylene, propylene, butylene, amylene, hexylene, octylene, dodecylene, tetradecylene, cetylene and eicosylene groups. These alkylene groups may have functional groups such as a hydroxyl group.

Examples of $Y^-$ in formula (3) include inorganic anionic groups derived from inorganic acids, e.g., phosphoric acid, sulfuric acid, nitric acid and sulfonic acid; organic anionic groups derived from organic acids, e.g., acetic acid, citric acid and formic acid; and halide ion groups, such as a chloride ion group and a bromide ion group.

Specific but non-limiting examples of the amphoteric surface active agent represented by formula (3) include carboxybetaines such as lauryl dimethyl amino acetate betaine; aminocarboxylic acids such as lauryl dimethyl amine oxide and octadecylamine acetate; and imidazolinumbetaines such as 2-lauryl-N-carboxymethyl-N-hydroxyethylimidazolinium. Particularly preferred among them are lauryl dimethyl amino acetate betaine, octadecylamine acetate and lauryl dimethyl amine oxide.

The amphoteric surface active agent represented by formula (3) can be a commercially available one, such as Amphitol 24B, Amphitol 86B, Amphitol 20BS, Amphitol 20N, Amphitol 20Y, Amphitol 20Z and MX-968 (all produced by Kao Corp.).

The amphoteric surface active agents of formula (3) can be used either individually or as a combination of two or more thereof.

The abrasive which can be used in the abrasive composition containing the aforementioned each abrasive auxiliary will be described. The abrasive includes abrasive particles that are generally used for abrasion, for example, alumina particles, SiC particles, diamond particles, $ZrO_2$ particles, MgO particles, cerium oxide particles, zirconium oxide particles, colloidal silica particles and humed silica particles, or composite particles containing two or more of these particles. Of these abrasives, one or more of alumina particles, SiC particles, cerium oxide particles, zirconium oxide particles, colloidal silica particles or humed silica particles are preferred for assuring an increase in abrasion rate. In particular, alumina particles, cerium oxide particles, zirconium oxide particles, colloidal silica particles or humed silica particles are suitable, and alumina particles are particularly suitable of all, for abrading substrates of magnetic recording media. In addition, intermediate alumina particles are preferred for their ability of extremely reducing the surface roughness. The term "intermediate alumina particles" is a generic term for alumina particles other than α-alumina particles, such as γ-alumina particles, δ-alumina particles, θ-alumina particles, η-alumina particles, and amorphous alumina particles. It is also preferred to use alumina particles that have re-dispersing property from secondary particles to primary particles, when the abrasive composition of the present invention is mechanically stirred or used for abrasion.

In the abrasive composition the abrasive takes a form of a slurry by the medium of water. The abrasive is generally used in an amount of 0.01 to 30% by weight, preferably 0.02 to 10% by weight, based on the abrasive composition, while the amount is subject to variation according to the viscosity of the abrasive composition or the quality required of a material to be abraded. With the amount of the abrasive falling within the above range, reduced surface roughness would be achieved with good productivity.

In relation to the amount of the abrasive auxiliary, the abrasive is preferably used in such an amount that the concentration ratio of the abrasive to the abrasive auxiliary (concentration (wt %) of the abrasive/concentration (wt %) of the abrasive auxiliary) ranges from 0.01 to 100. The concentration ratio of less than 0.01 may result in such a disadvantage as occurrence of slip of the abrasive during abrasion which may cause the reduction in an abrasion removal efficiency (a ratio of an actual depth of abrasion to a set depth of abrasion). If the concentration ratio exceeds 100, the effect of the abrasive auxiliary may be insubstantial. Thus, the above range is preferable. An abrasive/abrasive auxiliary concentration ratio is preferably 0.01 to 50, more preferably 0.01 to 25, still more preferably 0.02 to 10, most preferably 0.02 to 5.

The average primary particle size of the abrasive is preferably 0.002 to 3 $\mu$m. If it is less than 0.002 $\mu$m, the material removal efficiency by abrasion (rate of abrasion) may be considerably reduced. If it exceeds 3 $\mu$m, it may be difficult to reduce the surface roughness of a material to be abraded, especially a highly hard and brittle material such as glass, carbon and ceramic. Thus, the above range is preferred. An average primary particle size of the abrasive is more preferably 0.002 to 1 $\mu$m, still more preferably 0.01 to 1.0 $\mu$m, further more preferably 0.01 to 0.5 $\mu$m, particularly 0.02 to 0.5 $\mu$m, most particularly 0.02 to 0.2 $\mu$m.

In particular, the average primary particle size of alumina particles as an abrasive is preferably 0.01 to 0.5 $\mu$m, particularly 0.02 to 0.3 $\mu$m, and the average particle size of the secondary particle which is an agglomerate of the primary particle having the above-mentioned average primary particle is preferably 0.1 to 1.5 $\mu$m, more preferably 0.3 to 1.2 $\mu$m.

The average primary particle size of the abrasive can be measured by image analysis of a scanning electron micrograph of a powder prepared by dispersing 0.1 g of the abrasive with a prescribed dispersant (e.g., sodium polystyrene sulfonate) by ultrasonic wave application and drying the dispersion. Measurement with a Coulter counter (Model MULTISIZER-II, manufactured by Coulter Co.) will do for those having an average primary particle size of 2 $\mu$m or greater.

The abrasive preferably has a Knoop hardness number (JIS Z-225 1) of 700 to 9000. If the Knoop hardness number is smaller than 700, the abrasive may fail to achieve a sufficient rate of abrasion, resulting in reduction of productivity. If it exceeds 9000, the damaged layer (the layer suffering from microcracks or chipping) of the material to be abraded may have an increased thickness, resulting in deterioration of surface quality. Thus, the above range is preferred. A Knoop hardness number is more preferably 1000 to 5000, particularly preferably 1500 to 3000.

It is preferable for the abrasive to have a specific gravity of 2 to 6, particularly 2 to 4, from the standpoint of dispersibility, properties of being fed to an abrasive machine, and reusability.

Particularly preferred abrasives are a-alumina or γ-alumina particles having a Knoop hardness number of 1500 to 3000 and a purity of 98% by weight or higher, preferably 99% by weight or higher, particularly 99.9% by weight or higher. Since these abrasives can be prepared by a crystal growth method (e.g., Verneuil method) using a high purity aluminum salt, they are largely different from alumina prepared by a conventionally employed pulverizing method in shape and purity. Use of such abrasives is preferable because of manifesting a noticeable synergistic effect with the use of the abrasive auxiliary, while the reason is not quite clear.

The purity of the abrasive can be obtained by dissolving 1 to 3 g of the abrasive in an acid or alkali aqueous solution and determining the aluminum ion content by ICP (Inductively Coupled Plasma Atomic Emission Spectrochemical Analysis).

Water in the abrasive composition of the present invention serves as a medium. It is preferably used in a proportion of 60 to 99.8% by weight, more preferably 70 to 99.8% by weight, still more preferably 90 to 99.4% by weight, based on the abrasive composition. Within this range, good productivity is assured in abrasive processing.

The abrasive composition of the present invention may contain other additives in addition to the above-mentioned essential components. Included in useful additives is an abrasion accelerator such as a monomeric metal salt of an acid compound (hereinafter referred to as a monomeric additive). A combined use of the abrasive auxiliary and the monomeric additive as an abrasion accelerator brings about a further improved rate of abrasion as a synergic effect.

The terminology "monomeric" as in "monomeric metal salt of an acid component (monomeric additive)" means an acid compound metal salt having no polymerizability.

The acid compound is not particularly limited as long as it has some oxidizing effect. Examples of the acid compound include nitric acid, sulfuric acid, sulfurous acid, persulfuric acid, hydrochloric acid, perchloric acid, phosphoric acid, phosphorous acid, hypophosphorous acid, pyrophosphoric acid, carbonic acid, lactic acid, oxalic acid and benzoic acid; and organic acids having a functional group derived from these acids.

Metals in the metal salts of these acid compounds include aluminum, magnesium, nickel, sodium, potassium and iron, with aluminum, magnesium and sodium being preferred. Ammonium salts may be used in place of the metal salts.

The monomeric additives can be used either individually or as a combination of two or more thereof.

Where the abrasive composition of the present invention is used for abrading carbon substrates, it is particularly preferable to use, as a monomeric additive, at least one compound selected from the group consisting of a metal nitrate, a metal sulfate, a metal oxalate, a metal lactate and a metal benzoate. Inter alia, aluminum nitrate, aluminum oxalate, nickel sulfate, sodium lactate, aluminum lactate or nickel benzoate brings about a further enhanced effect in increasing the rate of abrasion.

The monomeric additive can be preferably added in an amount of 0.001 to 10% by weight, still preferably 0.01 to 5% by weight, particularly preferably 0.04 to 0.4% by weight, based on the abrasive composition of the present invention. Within this range, a sufficient improvement in rate of abrasion could be obtained. The addition of more than 10% by weight of the monomeric additive saturates the rate of abrasion, raises the cost and also may result in deterioration of surface quality due to waves, etc.

Besides the monomeric additive, the abrasive composition of the present invention can further contain various additives, such as surface active agents, alkalis, thickeners, dispersants, anti-corrosives, chelating agents, organic solvents, and so on. These additives can be added preferably in an amount of 0.01 to 5% by weight each based on the abrasive composition of the present invention.

The abrasive composition of the present invention has a pH of 1 to 13, preferably 2 to 11, still preferably 2 to 9 from the viewpoint of detergency to substrates, prevention of processing apparatus corrosion, and safety to human body. With the pH falling within this range, the abrasive auxiliary can exist stably and can be easily adsorbed onto the abrasive and the waste chips or powders resulting from abrasion. For abrading carbon substrates such as glass-like carbon substrates, a preferred pH of the abrasive composition is in an acidic side, i.e., 1 to 6, particularly 3 to 5, at which the rate of abrasion increases, satisfactory surface quality results, and the balance between productivity and quality is improved.

pH adjustment of the abrasive composition within the above range can be carried out by, for example, addition of prescribed amounts of the abrasive auxiliary and, if necessary, the monomeric additive to the abrasive composition.

The abrasive composition according to the present invention which contains the aforesaid abrasive auxiliaries and has a pH of 1 to 13 shows an improved rate of abrasion and provides an abraded surface with a low roughness. The reason for this performance is not quite clear but seems to be as follows.

That is, the abrasive auxiliary is adsorbed onto the surface of a material to be abraded thereby lessening the surface energy of the material, whereby the waste chips or powders are easy to release from the surface. The abrasive acts under this situation, which appears to result in a marked increase of rate of abrasion. Where an abrasive pad is used during the abrasion, unfavorable clogging of the surface of the pad with the waste chips would reduce the rate of abrasion or cause scratches. Such a problem does not occur in the present invention because the waste chips or powders are easily dispersed in wash water and thereby removed by the action of the abrasive auxiliary. Further, the surface to be abraded has smaller roughness than conventional abrasive compositions probably because the abrasive works on a softened surface to be abraded.

Materials that can be abraded with the abrasive composition of the present invention include metals such as aluminum, silicon, tungsten and copper; glass; carbon materials such as glass-like carbon and amorphous carbon; and ceramic materials such as $Al_2O_3 \cdot TiC$ and silicon dioxide, and resins such as polyimide resins. It is particularly preferable that the abrasive composition of the present invention be applied to brittle materials such as glass, carbon and ceramics, particularly carbon materials, because abrasive processing can be performed at a high rate while reducing the surface roughness by suppressing occurrences of surface defects such as pits and scratches, as compared with the use of conventional abrasive compositions. It is preferable that the abrasive composition of the present invention be applied to ductile materials such as aluminum and silicon, particularly Ni—P plated aluminum alloy substrates, because abrasive processing can be performed at a high rate while reducing the surface roughness by suppressing occurrences of surface defects such as pits and scratches, as compared with the use of conventional abrasive compositions.

The materials to be abraded are not restricted in shape. For example, shapes with a flat surface such as a disk, a plate, a slab, a prism, etc. and shapes with a curved surface, such as a lens, can be treated with the abrasive composition of the present invention. Inter alia, the abrasive composition of the present invention manifest its excellent effects in abrading the material in a disk shape.

In particular, the abrasive composition manifests its excellent effects in abrasive processing of carbon substrates such as glass-like carbon substrates and Ni—P plated aluminum alloy substrates, as will be demonstrated in Examples hereinafter described.

The abrasive composition of the present invention manifests extremely advantageous effects in abrading substrates of magnetic recording media such as a hard disk (fixed disk), optical disk, optical-magneto disk, particularly in abrading a hard disk substrate.

According to the present invention, there is provided a process for producing substrates for magnetic recording media comprising the step of abrading a substrate precursor with an abrasive composition containing at least an abrasive, an abrasive auxiliary, and water, wherein the above-described abrasive compositions are used.

The term "substrate" as used herein includes not only shapes with a flat surface, such as a disk, a plate, a slab, a prism, etc. but also shapes with a curved surface such as a lens.

Figure 1:
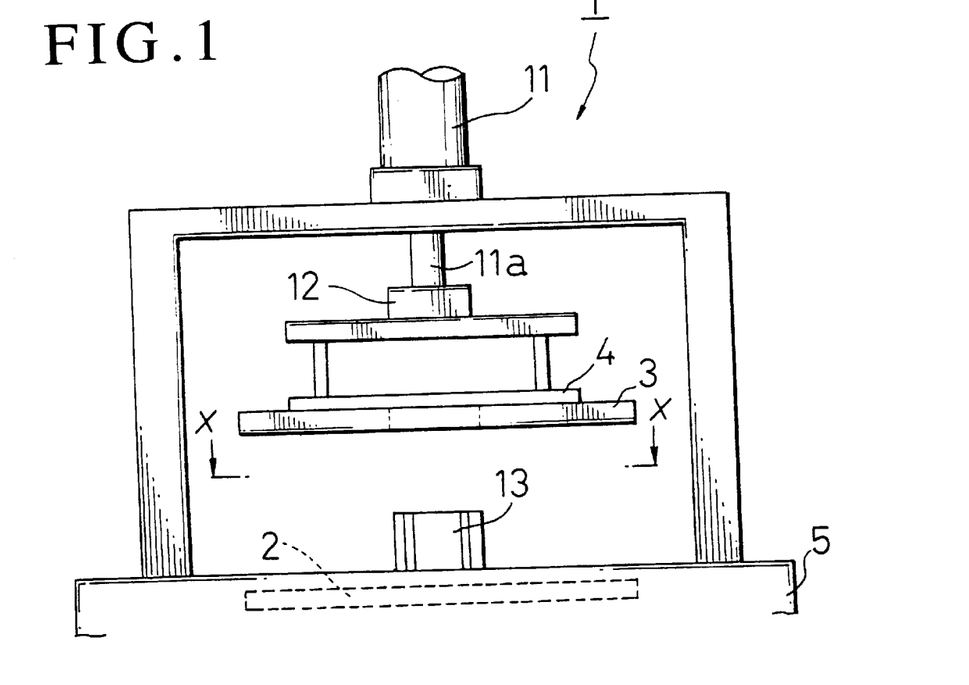
FIG. 1 is a schematic front view of a double side polishing machine preferably used in the process for producing substrates of magnetic recording media of the present invention.
Figure 2:
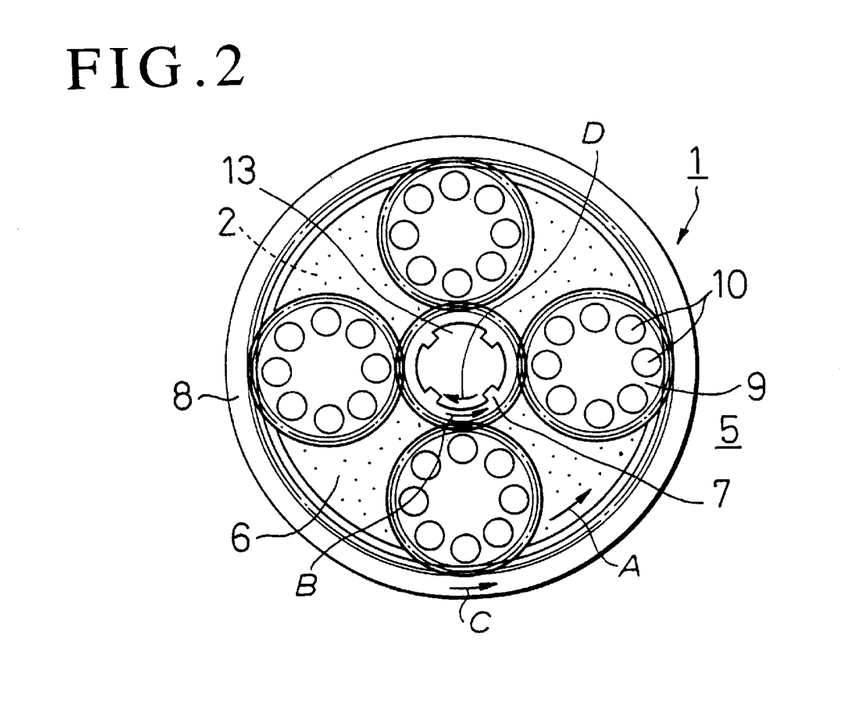
FIG. 2 is a view taken perpendicular to the arrow X—X of FIG. 1.

A preferred embodiment of the process for producing a substrate according to the present invention will be illustrated taking, for instance, a polishing process (final polishing) that is one of the abrasive processing steps involved in the process for producing substrates of magnetic recording media by referring to FIGS. 1 and 2. FIG. 1 is a schematic front view of a double sided polishing machine used in polishing glass-like carbon substrates and Ni—P plated aluminum alloy substrates. FIG. 2 is a view taken perpendicular to the arrow X—X of FIG. 1.

The double sided polishing machine 1 shown in FIG. 1 has a lower platen 2, an upper platen 3 placed above the lower platen 2, and a supporting plate 4 for the upper platen which is in contact with the upper platen 3 to support it.

As shown in FIG. 1, the upper platen 3 is rotatably fitted to the tip of an output rod 11a of an air cylinder 11 via a bracket 12. The upper platen 3 is moved vertically by the air cylinder 11. When the upper platen 3 goes down toward a base 5, it engages with grooves of a rotor 13 which rotates in the direction indicated by the arrow D in FIG. 2 and the upper platen 3 rotates in the same direction. A polishing pad is provided on the lower side of the upper platen 3. The upper platen 3 is firmly fixed to the supporting plate 4 with bolts (not shown) and is rotatable together with the supporting plate 4.

As shown in FIG. 2, the lower platen 2 is fitted on the base 5 and is rotatable to the direction indicated by the arrow A. A polishing pad 6 of the same kind as that on the upper platen 3 is provided on the upper side of the lower platen 2. Four planet gear-like carriers 9 are located on the lower platen 2. Each carrier 9 is engaged with both a sun gear 7, which is located at the center of the lower platen 2 and rotates in the direction indicated by the arrow B, and an internal gear 8, which is located on the outer circumference of the lower platen 2 and rotates in the direction indicated by the arrow C. Thus, each carrier 9 rotates around the sun gear 7 and around its own axes. Each carrier 9 has eight holes, and substrate precursors 10 of magnetic recording media are respectively set in the holes.

The substrate (or a precursor thereof) of a magnetic recording medium used in this particular embodiment is a disk made of glass-like carbon which is one of carbon materials or aluminum alloy having Ni—P plated surface.

The abrasive composition according to the present invention is supplied from a slurry feed pipe (not shown) to the position between the upper platen 3 and the lower platen 2 at a prescribed feed.

When the upper platen 3 is moved down by the air cylinder 11, the substrate precursors 10 which move together with each carrier 9 are sandwiched between the upper and lower platens 2 and 3, and, in this way the polishing process is carried out.

The raw substrate of a magnetic recording medium to be subjected to the above polishing process is prepared by forming a prescribed material into a disk followed by a lapping process (rough abrasion) for obtaining a prescribed surface roughness and a chamfering process.

The polishing process according to this embodiment is usually carried out under the following conditions.

The processing pressure is preferably 10 to 2000 gf/cm$^2$, more preferably 50 to 500 gf/cm$^2$.

The processing time is preferably 2 to 120 minutes, more preferably 2 to 30 minutes.

Where a brittle material, particularly a carbon substrate is abraded, the polishing pad fitted to the upper and lower platens of the double sided polishing machine preferably has a Shore hardness [JIS A (JIS K-6301)] of 88 to 98, particularly 88 to 95. Polishing pads made of resins such as polyurethane foam, or resin composites composed of polyester nonwoven fabric and polyurethane are preferred for further improving the rate of abrasion and further reducing the surface roughness.

The rotating speed of the lower platen of the double sided polishing machine may depend on the size of the processing machine. In using Model 9B manufactured by SPEED FAM Co., for example, a preferred rotating speed is 5 to 100 rpm, particularly 10 to 60 rpm.

The feed rate of the abrasive composition may depend on the size of the processing machine. In using Model 9B manufactured by SPEED FAM Co, it is preferably 5 to 300 cc/min, particularly 10 to 150 cc/min.

The abrasive in the abrasive composition has an average primary particle size of 0.002 to 3 μm, particularly 0.002 to 1 μm, and is present in a concentration of 0.01 to 30% by weight, particularly 0.02 to 10% by weight.

By polishing the lapped raw glass-like carbon substrate or raw Ni—P plated aluminum alloy substrate under the above-described conditions, there are obtained substrates having a surface roughness (center-line average roughness Ra) of about 4 to 35 Å in general, preferably about 4 to 25 Å, particularly preferably about 4 to 20 Å.

While the abrasive composition of the present invention is particularly effective in polishing, it is also applicable to other abrasive processes, such as a lapping process.

In the lapping process, the same double sided type machine shown in FIGS. 1 and 2 can be used as in the polishing process. The difference from the polishing process is that upper and lower lapping platens which have abrasive surface made of steel or the like are used without providing the polishing pad, and the abrasive composition is supplied through holes of the upper lapping platen. The abrasive particles used in the abrasive composition for a lapping process are greater than those for the polishing process, preferably having an average primary particle size, e.g., of 3 to 100 μm. The concentration of the abrasive is higher than that for the polishing process, preferably ranging, e.g., from 1 to 30% by weight, more preferably 2 to 20% by weight.

While the process for producing substrates for magnetic recording media according to the present invention has been described with reference to its preferred embodiment, the present invention is not limited thereto, and various changes and modifications can be made therein.

For example, the double sided polishing machine used in the abrasive process can be replaced with other type of machines.

As will be seen from Examples hereinafter given, materials to be abraded include, in addition to glass-like carbon, glass, ceramic materials such as $Al_2O_3 \cdot TiC$, metallic materials such as silicon and aluminum, and other carbon materials.

The process for producing substrates according to the present invention is applicable to not only the production of substrates of magnetic recording media but the production of substrates of precision devices involving an abrasive process, for example, the production of a semiconductor wafer, a semiconductor device, an optical lens, an optical mirror or half-mirror, and an optical prism. The abrasion of a semiconductor device involves a flattening process of insulating layers for conductive layers, a formation of embedded metal wire, a formation of insulating layers for embedded devices and a formation of embedded capacitors.

The advantageous effectiveness of the present invention will now be illustrated in greater detail by way of Examples shown below, but it should be understood that the present invention is not construed as being limited thereto.

EXAMPLES I-1 TO I-16 AND COMPARATIVE EXAMPLES I-1 TO I-9

The abrasive, abrasive auxiliary, and abrasive accelerator shown in Table I-1 below were mixed by stirring with water in the respective concentrations shown in Table I-1 to obtain an abrasive composition. The kinds of the abrasive auxiliaries and abrasive accelerators used are shown in Tables I-3 and I-4 below. α-Al$_2$O$_3$ and γ-Al$_2$O$_3$ shown in Table I-1 both had a purity of 99.98% by weight, except that α-Al$_2$O$_3$ used in Example I-3 and Comparative Example I-3 had a purity of 99.80% by weight.

A raw glass-like carbon (GC) substrate, a raw glass substrate, a raw Al$_2$O$_3$·TiC substrate and a raw silicon wafer each having a diameter of 1.8 inches and having been subjected to the lapping process to a center-line average roughness Ra of 0.1 μm were each polished by means of a double sided polishing machine using the abrasive composition under the following conditions.

Set Conditions of Double Sided Polishing Machine
  Machine: Model 9B manufactured by SPEED FAM Co.
  Processing pressure: 150 gf/cm$^2$
  Shore hardness of polishing pad: 90 (measured in accordance with JIS (JIS K-6301))
  Rotating speed of lower platen: 40 rpm
  Feed rate of abrasive composition: 50 cc/min The raw substrate of Examples and Comparative Examples were each polished for 30 minutes. The amount removed by abrasion was measured to obtain a relative rate of abrasion taking the result of Comparative Example as a standard. The results obtained are shown in Table I-2 below. The center-line average roughness Ra of each resulting substrate was measured according to the following manner, and the occurrence of scratches on the polished surface was evaluated according to the following standard of evaluation. The results obtained are also shown in Table I-2.

[Center-line Average Roughness Ra]

Measured with TALYSTEP manufactured by Rank Taylor Hobson Corp.

[Scratches]

The surface of each substrate was observed at 60 points at every 60° with an optical microscope (differential interference microscope) at 50 magnifications. The depth of the scratches was measured with ZYGO manufactured by Zygo Co.

Standard of Evaluation:

S . . . Zero scratch having a depth exceeding 500 Å per field.

A . . . Less than 0.5 scratch in average having a depth exceeding 500 Å per field.

B . . . Not less than 0. 5 but less than 1 scratch in average having a depth exceeding 500 Å per field.

C . . . One or more than one scratches in average having a depth exceeding 500 Å per field.

TABLE I-1

| | | | Abrasive Composition | | | | | |
|---|---|---|---|---|---|---|---|---|
| | | | Abrasive | | | Abrasive Auxiliary | Abrasive Accelerator | |
| | | Substrate | Kind | Particle Size*[1] | Knoop Hardness | Concentration*[2] | Kind/Concentration*[2] | Kind/Concentration*[2] | pH |
| Ex. | I-1 | GC | α-Al$_2$O$_3$ | 3 | ca. 2000 | 1 | a/1 | a/0.4 | 4.2 |
| | I-2 | GC | α-Al$_2$O$_3$ | 3 | ca. 2000 | 1 | a/1 | a/5 | 3.7 |
| | I-3 | GC | α-Al$_2$O$_3$ | 1 | ca. 2000 | 1 | d/1 | b/5 | 4.3 |
| | I-4 | GC | α-Al$_2$O$_3$ | 1 | ca. 2000 | 1 | b/1 | b/0.1 | 4.1 |
| | I-5 | GC | α-Al$_2$O$_3$ | 1 | ca. 2000 | 1 | d/1 | b/5 | 3.8 |
| | I-6 | GC | α-Al$_2$O$_3$ | 0.1 | ca. 1900 | 0.1 | b/1 | a/0.1 | 4.7 |
| | I-7 | GC | α-Al$_2$O$_3$ | 0.1 | ca. 1900 | 0.1 | b/1 | a/2 | 4.3 |
| | I-8 | GC | γ-Al$_2$O$_3$ | 0.05 | ca. 1800 | 0.1 | c/0.2 | b/0.4 | 5.3 |
| | I-9 | GC | γ-Al$_2$O$_3$ | 0.05 | ca. 1800 | 0.1 | c/1 | b/0.4 | 4.7 |
| | I-10 | GC | γ-Al$_2$O$_3$ | 0.05 | ca. 1800 | 0.1 | c/5 | b/0.4 | 4.1 |
| | I-11 | GC | γ-Al$_2$O$_3$ | 0.05 | ca. 1800 | 0.1 | c/10 | b/0.4 | 4.2 |
| | I-12 | GC | γ-Al$_2$O$_3$ | 0.02 | ca. 1750 | 0.1 | e/1 | b/0.01 | 5.7 |
| | I-13 | GC | γ-Al$_2$O$_3$ | 0.02 | ca. 1750 | 0.1 | e/2 | b/0.4 | 4.9 |
| | I-14 | Glass | ZrO$_2$ | 1 | ca. 730 | 1 | d/1 | c/0.4 | 4.6 |
| | I-15 | Al$_2$O$_3$·TiC | SiO$_2$ | 0.06 | ca. 850 | 0.1 | d/1 | c/0.4 | 4.6 |
| | I-16 | Silicon | γ-Al$_2$O$_3$ | 0.05 | ca. 1700 | 0.1 | d/1 | c/0.4 | 4.7 |
| Comp. Ex. | I-1 | GC | α-Al$_2$O$_3$ | 3 | ca. 2000 | 1 | —/— | —/— | 6.6 |
| | I-2 | GC | α-Al$_2$O$_3$ | 1 | ca. 2000 | 1 | —/— | —/— | 6.6 |
| | I-3 | GC | α-Al$_2$O$_3$ | 1 | ca. 2000 | 1 | —/— | —/— | 6.3 |
| | I-4 | GC | α-Al$_2$O$_3$ | 0.1 | ca. 1900 | 0.1 | —/— | —/— | 6.5 |
| | I-5 | GC | γ-Al$_2$O$_3$ | 0.05 | ca. 1800 | 0.1 | —/— | —/— | 6.7 |
| | I-6 | GC | γ-Al$_2$O$_3$ | 0.02 | ca. 1750 | 0.1 | —/— | —/— | 6.7 |
| | I-7 | Glass | ZrO$_2$ | 1 | ca. 730 | 1 | —/— | —/— | 6.4 |
| | I-8 | Al$_2$O$_3$·TiC | SiO$_2$ | 0.06 | ca. 850 | 0.1 | —/— | —/— | 6.5 |
| | I-9 | Silicon | γ-Al$_2$O$_3$ | 0.05 | ca. 1700 | 0.1 | —/— | —/— | 6.5 |

*[1]Average primary particle size (μm)
*[2]% by weight

TABLE I-2

| | | Evaluation | | |
|---|---|---|---|---|
| | | Relative Rate of Abrasion | Ra Å | Scratches |
| Ex. | I-1 | 5 | 16 | — |
| | I-2 | 8 | 21 | — |
| | I-3 | 7 | 17 | A |
| | I-4 | 8 | 12 | A |
| | I-5 | 21 | 14 | A |
| | I-6 | 6 | 10 | S |
| | I-7 | 10 | 11 | S |
| | I-8 | 16 | 7 | S |

TABLE I-2-continued

| | | Evaluation | | |
|---|---|---|---|---|
| | | Relative Rate of Abrasion | Ra Å | Scratches |
| | I-9 | 26 | 6 | S |
| | I-10 | 21 | 8 | S |
| | I-11 | 16 | 8 | S |
| | I-12 | 3 | 5.5 | S |
| | I-13 | 5 | 6 | S |
| | I-14 | 2 | 10 | S |
| | I-15 | 4 | 7 | S |
| | I-16 | 6 | 8 | A |
| Comp. Ex. | I-1 | 1 | 27 | — |
| | I-2 | 1 | 21 | C |
| | I-3 | 0.7 | 24 | C |
| | I-4 | 1 | 16 | C |
| | I-5 | 1 | 13 | B |
| | I-6 | 1 | 7 | B |
| | I-7 | 1 | 16 | B |
| | I-8 | 1 | 11 | B |
| | I-9 | 1 | 13 | C |

TABLE I-3

| | Abrasive Auxiliary |
|---|---|
| a | Emal 40 Paste [Kao Corp.] Sodium salt of higher alcohol (Palm Oil) sulfate |
| b | Sodium stearyl sulfate |
| c | Sodium lauryl sulfate |
| d | Ammonium lauryl sulfate |
| e | Sodium octyl sulfate |

TABLE I-4

| | Abrasive Accelerator |
|---|---|
| a | Aluminum nitrate |
| b | Aluminum lactate |
| c | Nickel benzoate |

As is apparent from the results in Table I-2, where the substrates were abraded with use of the abrasive compositions of the present invention which contain an aliphatic organic sulfate as an abrasive auxiliary and have an adjusted pH of 1 to 13 (Examples I-1 to I-16), a surface roughness was reduced and at a rate of abrasion was improved while suppressing the occurrence of scratches, as compared with comparative abrasive compositions containing no aliphatic organic sulfate (Comparative Examples I-1 to I-9).

EXAMPLES II-1 TO II-14 AND COMPARATIVE EXAMPLES II-1 TO II-8

An abrasive composition was obtained in the same manner as in Example I-1 except that the abrasive, abrasive auxiliary, and abrasive accelerator shown in Table II-1 below were mixed by stirring with water in the respective concentrations shown in Table II-1. The kinds of the abrasive auxiliaries used are shown in Table II-3 below. The kinds of the abrasive accelerators used are shown in Table I-4 above. $\alpha\text{-Al}_2\text{O}_3$ and $\gamma\text{-Al}_2\text{O}_3$ shown in Table II-1 both had a purity of 99.98% by weight, except that $\alpha\text{-Al}_2\text{O}_3$ used in Example II-3 and Comparative Example II-3 had a purity of 99.80% by weight.

Each of the substrate precursors prepared in the same manner as in Example I-1 was polished by means of a double sided polishing machine using the abrasive composition under the same conditions as in Example I-1. In the same manner as in Example I-1, a relative rate of abrasion of each substrate precursor was obtained, the center-line average roughness Ra of the resulting substrate was measured, and the occurrence of scratches on the polished surface was evaluated. The results obtained are shown in Table II-2.

TABLE II-1

| | | | Abrasive Composition | | | | | |
|---|---|---|---|---|---|---|---|---|
| | | | Abrasive | | | Abrasive Auxiliary | Abrasive Accelerator | |
| | | Substrate | Kind | Particle Size*[1] | Knoop Hardness | Concentration*[2] | Kind/Concentration*[2] | Kind/Concentration*[2] | pH |
| Ex. | II-1 | GC | $\alpha\text{-Al}_2\text{O}_3$ | 3 | ca. 2000 | 1 | f/1 | a/0.4 | 4.2 |
| | II-2 | GC | $\alpha\text{-Al}_2\text{O}_3$ | 3 | ca. 2000 | 1 | g/1 | a/5 | 4.4 |
| | II-3 | GC | $\alpha\text{-Al}_2\text{O}_3$ | 1 | ca. 1900 | 1 | h/1 | b/5 | 4.9 |
| | II-4 | GC | $\alpha\text{-Al}_2\text{O}_3$ | 1 | ca. 1900 | 1 | h/1 | b/0.1 | 4.7 |
| | II-5 | GC | $\alpha\text{-Al}_2\text{O}_3$ | 1 | ca. 1900 | 1 | h/1 | b/5 | 5.0 |
| | II-6 | GC | $\gamma\text{-Al}_2\text{O}_3$ | 0.1 | ca. 1800 | 0.1 | h/1 | a/0.1 | 4.7 |
| | II-7 | GC | $\gamma\text{-Al}_2\text{O}_3$ | 0.1 | ca. 1800 | 0.1 | h/1 | a/2 | 4.8 |
| | II-8 | GC | $\gamma\text{-Al}_2\text{O}_3$ | 0.05 | ca. 1750 | 0.1 | i/0.2 | b/0.4 | 3.5 |
| | II-9 | GC | $\gamma\text{-Al}_2\text{O}_3$ | 0.05 | ca. 1750 | 0.1 | i/1 | b/0.4 | 4.3 |
| | II-10 | GC | $\gamma\text{-Al}_2\text{O}_3$ | 0.05 | ca. 1750 | 0.1 | i/5 | b/0.4 | 4.6 |
| | II-11 | GC | $\gamma\text{-Al}_2\text{O}_3$ | 0.05 | ca. 1750 | 0.1 | i/10 | b/0.4 | 4.8 |
| | II-12 | Glass | $\text{ZrO}_2$ | 1 | ca. 730 | 1 | j/1 | c/0.4 | 4.3 |
| | II-13 | $\text{Al}_2\text{O}_3\cdot\text{TiC}$ | $\text{SiO}_2$ | 0.06 | ca. 850 | 0.1 | j/1 | c/0.4 | 4.2 |
| | II-14 | Silicon | $\gamma\text{-Al}_2\text{O}_3$ | 0.05 | ca. 1750 | 0.1 | j/1 | c/0.4 | 4.2 |
| Comp. Ex. | II-1 | GC | $\alpha\text{-Al}_2\text{O}_3$ | 3 | ca. 2000 | 1 | —/— | —/— | 6.6 |
| | II-2 | GC | $\alpha\text{-Al}_2\text{O}_3$ | 3 | ca. 1900 | 1 | —/— | —/— | 6.6 |

TABLE II-1-continued

| | | | Abrasive Composition | | | | | |
|---|---|---|---|---|---|---|---|---|
| | | | Abrasive | | | Abrasive Auxiliary | Abrasive Accelerator | |
| | Substrate | Kind | Particle Size*[1] | Knoop Hardness | Concentration*[2] | Kind/Concentration*[2] | Kind/Concentration*[2] | pH |
| II-3 | GC | $\alpha\text{-Al}_2\text{O}_3$ | 1 | ca. 1900 | 1 | —/— | —/— | 6.3 |
| II-4 | GC | $\gamma\text{-Al}_2\text{O}_3$ | 0.1 | ca. 1800 | 0.1 | —/— | —/— | 6.5 |
| II-5 | GC | $\gamma\text{-Al}_2\text{O}_3$ | 0.05 | ca. 1750 | 0.1 | —/— | —/— | 6.7 |
| II-6 | Glass | $\text{ZrO}_2$ | 1 | ca. 730 | 1 | —/— | —/— | 6.5 |
| II-7 | $\text{Al}_2\text{O}_3\cdot\text{TiC}$ | $\text{SiO}_2$ | 0.06 | ca. 850 | 0.1 | —/— | —/— | 6.5 |
| II-8 | Silicon | $\gamma\text{-Al}_2\text{O}_3$ | 0.05 | ca. 1750 | 0.1 | —/— | —/— | 6.4 |

*[1]Average primary particle size ($\mu$m)
*[2]% by weight

TABLE II-2

| | | Evaluation | | |
|---|---|---|---|---|
| | | Relative Rate of Abrasion | Ra Å | Scratches |
| Ex. | II-1 | 3.5 | 21 | — |
| | II-2 | 5.7 | 23 | — |
| | II-3 | 4.5 | 18 | A |
| | II-4 | 6 | 14 | A |
| | II-5 | 14 | 16 | A |
| | II-6 | 4.6 | 11 | S |
| | II-7 | 9 | 11 | S |
| | II-8 | 12 | 8 | S |
| | II-9 | 20 | 7 | S |
| | II-10 | 16 | 9 | S |
| | II-11 | 13 | 9 | S |
| | II-12 | 1.7 | 11 | S |
| | II-13 | 3 | 7.5 | S |
| | II-14 | 5 | 9 | A |
| Comp. Ex. | II-1 | 1 | 27 | — |
| | II-2 | 1 | 21 | C |
| | II-3 | 0.7 | 24 | B |
| | II-4 | 1 | 16 | B |
| | II-5 | 1 | 13 | B |
| | II-6 | 1 | 13 | B |
| | II-7 | 1 | 16 | B |
| | II-8 | 1 | 11 | C |

TABLE II-3

| | Abrasive Auxiliary |
|---|---|
| f | Sodium polyoxyethylene lauryl ether sulfate<br>Formula: $C_{12}H_{25}O(CH_2CH_2O)_3SO_3Na$ |
| g | Potassium polyoxyethylene lauryl ether sulfate<br>Formula: $C_{12}H_{25}O(CH_2CH_2O)_3SO_3K$ |
| h | Triethanolamine polyoxyethylene lauryl ether sulfate<br>Formula: $C_{12}H_{25}O(CH_2CH_2O)_3SO_3N(CH_2CH_2OH)_3$ |
| i | Sodium polyoxyethylene octylphenyl ether sulfate<br>Formula: $C_8H_{17}$—⟨phenyl⟩—$O(CH_2CH_2O)_3SO_3Na$ |
| j | Sodium polyoxyethylene lauryl ether sulfate<br>Formula: $C_{12}H_{25}O(CH_2CH_2O)_2SO_3Na$ |

As is apparent from the results in Table II-2, where the substrates were abraded with use of the abrasive compositions of the present invention which contain an oxyalkylene alkyl ether sulfate represented by formula (2) as an abrasive auxiliary and have an adjusted pH of 1 to 13 (Examples II-1 to II-14), a surface roughness was reduced and a rate of abrasion was improved while suppressing the occurrence of scratches, as compared with comparative abrasive compositions containing no oxyalkylene alkyl ether sulfate (Comparative Examples II-1 to II-8).

EXAMPLES III-1 TO III-13 AND COMPARATIVE EXAMPLES III-1 TO III-7

An abrasive composition was obtained in the same manner as in Example I-1 except that the abrasive, abrasive auxiliary, and abrasive accelerator shown in Table III-1 below were mixed by stirring with water in the respective concentrations shown in Table III-1. The kinds of the abrasive auxiliaries used are shown in Table III-3 above. The kinds of the abrasive accelerators used are shown in Table I-4 above. $\alpha\text{-Al}_2\text{O}_3$ and $\gamma\text{-Al}_2\text{O}_3$ shown in Table III-1 both had a purity of 99.98% by weight.

Each of the substrate precursors prepared in the same manner as in Example I-1 was polished by means of a double sided polishing machine using the abrasive composition under the same conditions as in Example I-1. In the same manner as in Example I-1, a relative rate of abrasion of each substrate precursor was obtained, with polishing time being prolonged to 120 minutes, and the occurrence of scratches on the polished surface was evaluated. The results obtained are shown in Table III-2.

TABLE III-1

| | | Substrate | Abrasive Kind | Abrasive Particle Size*1 | Abrasive Knoop Hardness | Concentration*2 | Abrasive Auxiliary Kind/Concentration*2 | Abrasive Accelerator Kind/Concentration*2 | pH |
|---|---|---|---|---|---|---|---|---|---|
| Ex. | III-1 | GC | α-Al₂O₃ | 3 | ca. 2000 | 1 | k/1 | a/0.4 | 4.2 |
| | III-2 | GC | α-Al₂O₃ | 3 | ca. 2000 | 1 | l/1 | a/D.4 | 4.1 |
| | III-3 | GC | α-Al₂O₃ | 1 | ca. 1900 | 1 | k/1 | b/0.1 | 4.5 |
| | III-4 | GC | α-Al₂O₃ | 1 | ca. 1900 | 1 | l/1 | b/0.5 | 4.3 |
| | III-5 | GC | γ-Al₂O₃ | 0.1 | ca. 1800 | 0.1 | o/1 | a/0.1 | 4.6 |
| | III-6 | GC | γ-Al₂O₃ | 0.1 | ca. 1800 | 0.1 | o/1 | a/2 | 3.9 |
| | III-7 | GC | γ-Al₂O₃ | 0.05 | ca. 1750 | 0.1 | k/0.2 | b/0.4 | 4.1 |
| | III-8 | GC | γ-Al₂O₃ | 0.05 | ca. 1750 | 0.1 | k/1 | b/0.4 | 4.2 |
| | III-9 | GC | γ-Al₂O₃ | 0.05 | ca. 1750 | 0.1 | k/5 | b/0.4 | 4.4 |
| | III-10 | GC | γ-Al₂O₃ | 0.05 | ca. 1750 | 0.1 | k/10 | b/0.4 | 4.6 |
| | III-11 | Glass | ZrO₂ | 1 | ca. 750 | 1 | m/1 | c/0.4 | 5.0 |
| | III-12 | Al₂O₃.TiC | SiO₂ | 0.06 | ca. 850 | 0.1 | n/1 | c/0.4 | 5.9 |
| | III-13 | Silicon | γ-Al₂O₃ | 0.05 | ca. 1750 | 0.1 | n/1 | c/0.4 | 4.8 |
| Comp. Ex. | III-1 | GC | α-Al₂O₃ | 3 | ca. 2000 | 1 | —/— | —/— | 6.6 |
| | III-2 | GC | α-Al₂O₃ | 1 | ca. 1900 | 1 | —/— | —/— | 6.6 |
| | III-3 | GC | γ-Al₂O₃ | 0.1 | ca. 1800 | 0.1 | —/— | —/— | 6.5 |
| | III-4 | GC | γ-Al₂O₃ | 0.05 | ca. 1750 | 0.1 | —/— | —/— | 6.7 |
| | III-5 | Glass | ZrO₂ | 1 | ca. 750 | 1 | —/— | —/— | 6.5 |
| | III-6 | Al₂O₃.TiC | SiO₂ | 0.06 | ca. 850 | 0.1 | —/— | —/— | 6.5 |
| | III-7 | Silicon | γ-Al₂O₃ | 0.05 | ca. 1750 | 0.1 | —/— | —/— | 6.4 |

*1 Average primary particle size ($\mu$m)
*2 % by weight

TABLE III-2

| | | Relative Rate of Abrasion | Ra Å | Scratches |
|---|---|---|---|---|
| Ex. | III-1 | 6 | | — |
| | III-2 | 5 | | — |
| | III-3 | 8 | | A |
| | III-4 | 15 | | A |
| | III-5 | 7 | | S |
| | III-6 | 13 | | S |
| | III-7 | 9 | | S |
| | III-8 | 18 | | S |
| | III-9 | 15 | | S |
| | III-10 | 11 | | S |
| | III-11 | | 1.4 | S |
| | III-12 | | 2.1 | S |
| | III-13 | | 3.5 | A |
| Comp. Ex. | III-1 | 1 | | — |
| | III-2 | 1 | | C |
| | III-3 | 1 | | B |
| | III-4 | 1 | | B |
| | III-5 | 1 | | B |
| | III-6 | 1 | | B |
| | III-7 | | 1 | C |

TABLE III-3

Abrasive Auxiliary k  Amphitol 24B [Kao Corp.]
   (Lauryl dimethyl amino acetate betaine, Formula: $C_{12}H_{25}-\overset{CH_3}{\underset{CH_3}{N^+}}-CH_2COO^-$)

TABLE III-3-continued

Abrasive Auxiliary l  Amphitol 20BS [Kao Corp.]
   (High grade Lauryl dimethyl amino acetate betaine,
   Formula: same as Abrasive Auxiliary k.)

m  Amphitol 20N [Kao Corp.]
   (Lauryl dimethyl amine oxide,

Formula: $C_{12}H_{25}-\overset{CH_3}{\underset{CH_3}{N^+}}-O^-$)

n  Amphitol 20Y [Kao Corp.]
   (2-Lauryl-N-carboxymethyl-N-hydroxyimidazolinium betaine, Formula: $C_{12}H_{25}-C\overset{N=CH_2}{\underset{N^+-CH_2}{\diagup}}$
   $HOH_2CH_2C \quad CH_2COO^-$)

o  Octadecylamine acetate,
   Formula: $CH_3(CH_2)_{17}NHCH_2COOH$

As is apparent from the results in Table III-2, the abrasive compositions of the present invention which contain an amphoteric surface active agent as an abrasive auxiliary and have an adjusted pH of 1 to 13 (Examples III-1 to III-13) provide a good quality polished substrate with suppressed scratches at an improved rate of abrasion, as compared with comparative abrasive compositions containing no amphoteric surface active agent (Comparative Examples III-1 to III-7).

EXAMPLES IV-1 TO IV-20 AND COMPARATIVE EXAMPLES IV-1 TO IV-3

An abrasive composition was obtained in the same manner as in Example I-1 except that the abrasive, abrasive auxiliary, and abrasive accelerator shown in Table IV-1 below were mixed by stirring with water in the respective concentrations shown in Table IV-1. The kinds of the abrasive auxiliaries used are shown in Tables IV-3 below. The pH is adjusted with sulfuric acid in Example IV-4 to IV-6 and Example IV-18 and with sodium hydroxide in Example IV-20.

A Ni—P plated aluminum alloy substrate having a diameter of 2.5 inches and having been subjected to the lapping process to a center-line average roughness Ra of 0.1 μm was polished by means of a double sided polishing machine using the abrasive composition under the following conditions.

Set Conditions of Double Sided Polishing Machine
  Machine: Model 6B manufactured by KYORITSU SEIKI
  Processing pressure: 100 gf/cm²
  Polishing pad: POLYTEX DG
  Rotating speed of lower platen: 40 rpm
  Feed rate of abrasive composition: 30 cc/min The raw substrate of Examples and Comparative Examples were subjected to the polishing process for 7 minutes, and a relative rate of abrasion was obtained in the same manner as in Example I-1. The surface roughness of the resulting substrates was measured in the same manner as in Example I-1 to obtain a relative rate taking the result of Comparative Example as a standard, and the occurrence of scratches on the polished surface was evaluated in the same manner as in Example I-1. The results obtained are also shown in Table IV-2.

TABLE IV-2

|  |  | Evaluation | | |
|---|---|---|---|---|
|  |  | Relative Rate of Abrasion | Relative surface Roughness | Scratches |
| Ex. | IV-1 | 1.15 | 0.51 | A |
|  | IV-2 | 1.15 | 0.55 | A |
|  | IV-3 | 1.10 | 0.58 | A |
|  | IV-4 | 1.20 | 0.56 | S |
|  | IV-5 | 1.15 | 0.62 | S |
|  | IV-6 | 1.13 | 0.64 | S |
|  | IV-7 | 1.34 | 0.66 | A |
|  | IV-8 | 1.10 | 0.66 | S |
|  | IV-9 | 1.10 | 0.76 | S |
|  | IV-10 | 1.06 | 0.88 | S |
|  | IV-11 | 1.06 | 0.90 | S |
|  | IV-12 | 1.44 | 0.83 | A |
|  | IV-13 | 1.11 | 0.65 | S |
|  | IV-14 | 1.42 | 0.76 | A |
|  | IV-15 | 1.08 | 0.85 | S |
|  | IV-16 | 1.02 | 0.97 | S |
|  | IV-17 | 1.00 | 0.40 | S |
|  | IV-18 | 1.03 | 0.71 | S |
|  | IV-19 | 1.19 | 0.73 | S |
|  | IV-20 | 1.00 | 0.63 | S |
| Comp. Ex. | IV-1 | 1.00 | 1.00 | C |
|  | IV-2 | 1.00 | 1.00 | C |
|  | IV-3 | 1.00 | 1.00 | C |

TABLE IV-1

| | | Abrasive Composition | | | | | | |
|---|---|---|---|---|---|---|---|---|
| | | Abrasive | | | | Abrasive Auxiliary | | |
| | | Kind | Particle Size*¹ | Purity*² | Knoop Hardness | Concentration*² | Kind | Concentration*² | pH |
| Ex. | IV-1 | α-Al₂O | 1.0 | 99.98 | ca. 2000 | 10.0 | Emal 0 | 1.0 | 7.8 |
| | IV-2 | α-Al₂O | 1.0 | 99.98 | ca. 2000 | 10.0 | Emal 0 | 3.0 | 7.8 |
| | IV-3 | α-Al₂O | 1.0 | 99.98 | ca. 2000 | 10.0 | Emal 0 | 5.0 | 7.8 |
| | IV-4 | α-Al₂O | 1.2 | 99.6 | ca. 2000 | 10.0 | Emal 0 | 1.0 | 4.0 |
| | IV-5 | α-Al₂O | 1.2 | 99.6 | ca. 2000 | 10.0 | Emal 0 | 3.0 | 4.0 |
| | IV-6 | α-Al₂O | 1.2 | 99.6 | ca. 2000 | 10.0 | Emal 0 | 5.0 | 4.0 |
| | IV-7 | α-Al₂O | 1.2 | 99.6 | ca. 2000 | 10.0 | Emal 0 | 1.0 | 7.5 |
| | IV-8 | α-Al₂O | 1.2 | 99.6 | ca. 2000 | 10.0 | Emal 0 | 3.0 | 7.5 |
| | IV-9 | α-Al₂O | 1.2 | 99.6 | ca. 2000 | 10.0 | Emal 0 | 5.0 | 7.5 |
| | IV-10 | α-Al₂O | 1.2 | 99.6 | ca. 2000 | 10.0 | Emal TD | 1.0 | 7.5 |
| | IV-11 | α-Al₂O | 1.2 | 99.6 | ca. 2000 | 10.0 | Emal Ad-25 | 1.0 | 7.5 |
| | IV-12 | α-Al₂O | 1.2 | 99.6 | ca. 2000 | 10.0 | Emal 40 | 1.0 | 7.5 |
| | IV-13 | γ-Al₂O | 0.05 | 99.98 | ca. 1750 | 10.0 | Emal 0 | 5.0 | 7.8 |
| | IV-14 | α-Al₂O | 1.2 | 99.6 | ca. 2000 | 10.0 | Emal 20C | 1.0 | 7.5 |
| | IV-15 | α-Al₂O | 1.2 | 99.6 | ca. 2000 | 10.0 | Emal NC-35 | 1.0 | 7.5 |
| | IV-16 | α-Al₂O | 1.2 | 99.6 | ca. 2000 | 10.0 | Amphitol 24B | 1.0 | 7.5 |
| | IV-17 | α-Al₂O | 1.2 | 99.6 | ca. 2000 | 10.0 | Amphitol 86B | 1.0 | 7.5 |
| | IV-18 | α-Al₂O | 1.2 | 99.6 | ca. 2000 | 10.0 | Quartamin24P | 1.0 | 4.0 |
| | IV-19 | α-Al₂O | 1.2 | 99.6 | ca. 2000 | 10.0 | Quartamin24P | 1.0 | 7.5 |
| | IV-20 | α-Al₂O | 1.2 | 99.6 | ca. 2000 | 10.0 | Quartamin24P | 1.0 | 10.0 |
| Comp. Ex. | IV-1 | α-Al₂O | 1.0 | 99.98 | ca. 2000 | 10.0 | — | — | 8.0 |
| | IV-2 | α-Al₂O | 1.2 | 99.6 | ca. 2000 | 10.0 | — | — | 7.8 |
| | IV-3 | γ-Al₂O | 0.05 | 99.98 | ca. 1750 | 10.0 | — | — | 7.7 |

*¹Average primary particle size (μm)
*²% by weight

TABLE IV-3

| | |
|---|---|
| Emal O | Sodium lauryl sulfate |
| Emal TD | Triethanolamine lauryl sulfate |
| Emal AD-25 | Ammonium lauryl sulfate |
| Emal 40 | Sodium salt of higher alcohol (palm oil) sulfate |
| Emal 20C | Sodium polyoxyethylene lauryl ether sulfate |
| Emal NC-35 | Sodium polyoxyethylene alkylphenyl ether sulfate |
| Amphitol 24B | Lauryl dimethyl amino acetate betaine |
| Amphitol 86B | Stearyl dimethyl amino acetate betaine |
| Quartamin 24 P | Lauryl trimethyl ammonium chloride |

As is apparent from the results in Table IV-2, the abrasive compositions of the present invention which contain an aliphatic organic sulfate, an oxyalkylene alkyl ether sulfate and an amphoteric surface active agent as an abrasive auxiliary and have an adjusted pH of 1 to 13 (Examples IV-1 to IV-20) provide a low surface roughness at an improved rate of abrasion while suppressing the occurrence of scratches with even a ductile material of a Ni—P plated aluminum alloy substrate, as compared with comparative abrasive compositions which do not contain the above abrasive auxiliaries (Comparative Examples IV-1 to IV-3).

INDUSTRIAL APPLICABILITY

As described above, according to the present invention, there is provided an abrasive composition for substrates of magnetic recording media and a process for producing substrates for magnetic recording media which achieve an increased rate of abrasion and provide an abraded surface with a low roughness without causing surface defects such as pits and scratches. The present invention thus makes it feasible to shorten the process, brings about greatly improved productivity, and reduces the cost markedly in the production of substrates of magnetic recording media.

The abrasive composition for substrates of magnetic recording media of the present invention particularly manifests its advantageous effects in abrading brittle materials such as glass, carbon and ceramics, and abrading ductile materials such as Ni—P plated aluminum alloy, especially suited for polishing.

What is claimed is:

1. A process for producing substrates of magnetic recording media, the process comprising abrading a raw substrate with an abrasive composition containing at least an abrasive, an abrasive auxiliary and water, wherein the abrasive comprises $\alpha\text{-Al}_2\text{O}_3$ or $\gamma\text{-Al}_2\text{O}_3$ particles having a Knoop hardness number of 1500 to 3000 and a purity of 99.9% by weight or higher;

the abrading comprises a lapping process followed by a polishing process, and a polishing pad having a Shore hardness (JIS A (JIS K-6301)) of 88 to 98 is used in the polishing process;

the abrasive auxiliary comprises an aliphatic organic sulfate represented by the formula (1):

$$R\text{—O—}SO_3M \tag{1}$$

where R represent a straight-chain or branched-chain alkyl group, an aryl group or an alkylaryl group each having 8 to 14 carbon atoms; and M represents an alkali metal, an alkaline earth metal or an organic cation, or an oxyalkylene alkyl ether sulfate represented by the formula (2):

$$R\text{—O—}(AO)_n\text{—}SO_3M \tag{2}$$

where R represents a straight-chain or branched-chain alkyl group, an aryl group or an alkyaryl group each having 8 to 14 carbon atoms; AO represents an oxyalkylene group having 2 or 3 carbon atoms; n represents a natural number of 2 to 4; and M represents an alkali metal, an alkaline earth metal or an organic cation;

the weight ratio of the abrasive to the abrasive auxiliary is from 0.01 to 25;

the raw substrate is selected from the group consisting of a carbon substrate and a Ni—P plated aluminum alloy substrate; and the abrasive composition has a pH of 1 to 6.

2. The process according to claim 1, wherein the abrasive comprises particles having an average primary particle size of 0.002 to 3 μm.

3. The process according to claim 2, wherein the average particle size of the secondary particle which is an agglomerate of the primary particle is 0.1 to 1.5 μm.

4. The process according to claim 1, wherein R in the aliphatic organic sulfate represented by the formula (1) or in the oxyalkylene alkyl ether sulfate represented by the formula (2) has 10 to 14 carbon atoms.

5. The process according to claim 1, wherein the abrasive auxiliary comprises the oxyalkylene alkyl ether sulfate represented by the formula (2).

6. The process according to claim 5, wherein the abrasive comprises particles having an average primary particle size of 0.002 to 3 μm.

7. The process according to claim 6, wherein the average particle size of the secondary particle which is an agglomerate of the primary particle is 0.1 to 1.5 μm.

8. The process according to claim 5, wherein R in the oxyalkylene alkyl ether sulfate represented by the formula (2) has 10 to 14 carbon atoms.

* * * * *